(12) United States Patent
Maxwell et al.

(10) Patent No.: US 10,129,395 B1
(45) Date of Patent: Nov. 13, 2018

(54) SYSTEMS AND RELATED METHODS FOR VISUAL INDICATION OF CALLEE ID INFORMATION FOR AN INCOMING COMMUNICATION REQUEST IN A HEARING-IMPAIRED ENVIRONMENT

(71) Applicant: SORENSON IP HOLDINGS LLC, Salt Lake City, UT (US)

(72) Inventors: Conrad Arlo Maxwell, Herriman, UT (US); Mark David Nelson, West Jordan, UT (US); Brett Thelin, Herriman, UT (US); Brent Giles, Kaysville, UT (US); Eric Von Winsor, West Jordan, UT (US)

(73) Assignee: SORENSON IP HOLDINGS LLC, Salt Lake City, UT (US)

( * ) Notice: Subject to any disclaimer, the term of this patent is extended or adjusted under 35 U.S.C. 154(b) by 0 days.

(21) Appl. No.: 15/794,896

(22) Filed: Oct. 26, 2017

(51) Int. Cl.
*H04M 11/00* (2006.01)
*H04M 1/56* (2006.01)
(Continued)

(52) U.S. Cl.
CPC ..... *H04M 3/42391* (2013.01); *H04M 1/2475* (2013.01); *H04M 1/576* (2013.01);
(Continued)

(58) Field of Classification Search
CPC .. H04M 15/56; H04M 15/8044; H04M 7/006; H04M 3/42391; H04M 7/128;
(Continued)

(56) References Cited

U.S. PATENT DOCUMENTS 4,365,238 A 12/1982 Kollin
4,379,210 A 4/1983 Sparber
(Continued)

FOREIGN PATENT DOCUMENTS

EP 1324578 A2 7/2003
EP 1768353 A2 3/2007
(Continued)

OTHER PUBLICATIONS

Callee ID Internet web Trademark Search results "callee id « NameCheck«TrademarkNow", accessed Jul. 24, 2017; https://app.trademarknow.com/namecheck-report?brand=callee%20id&product=communications%20by%20telephone®ion=US; 8 Pages%20telephone®ion=US; 8 Pages.
(Continued)

*Primary Examiner* — Binh Kien Tieu
(74) *Attorney, Agent, or Firm* — TraskBritt

(57) ABSTRACT

Systems and methods for visually indicating an occurrence of an incoming call for the hearing impaired are disclosed. A video communication device may be configured to receive an incoming communication to at least two unique identifiers assigned by a video relay service provider. The video communication device can display a unique visual indicator pattern, which may be user-created and user-assigned to the one of the at least two unique identifiers dialed by a caller. The visual indicator pattern may be indicative of the existence an incoming call, the origin of the call, the destination device for the call, the destination ID for the call, or combinations thereof. The video communication device, when receiving an incoming call, may send a wireless notification signal to other communication devices, thereby notifying other devices that a video communication device is receiving an incoming call.

20 Claims, 11 Drawing Sheets

(51) Int. Cl.
*H04M 15/06* (2006.01)
*H04M 1/00* (2006.01)
*H04M 3/00* (2006.01)
*H04M 3/42* (2006.01)
*H04M 19/04* (2006.01)
*H04M 1/247* (2006.01)
*H04M 1/57* (2006.01)
*H04M 3/04* (2006.01)
*H04M 1/725* (2006.01)

(52) U.S. Cl.
CPC ........... *H04M 3/04* (2013.01); *H04M 19/048* (2013.01); *H04M 1/7253* (2013.01); *H04M 2201/38* (2013.01)

(58) Field of Classification Search
CPC .... H04M 2250/22; H04M 1/57; H04M 1/663; H04M 1/72519; H04M 2250/16; H04W 8/183; H04W 8/18; H04W 8/22; H04W 8/28; H04W 8/204; G06K 19/07739
USPC ......... 348/14.01, 14.02, 14.03, 14.07, 14.09; 379/52, 142.01, 142.06, 142.17, 373.01, 379/373.02, 373.03, 374.03, 376.02
See application file for complete search history.

(56) References Cited

U.S. PATENT DOCUMENTS

| | | | |
|---|---|---|---|
| 4,578,542 A | 3/1986 | Alderman | |
| 4,608,457 A | 8/1986 | Fowler et al. | |
| 4,707,855 A | 11/1987 | Pasinski et al. | |
| 4,833,709 A | 5/1989 | Pasinski et al. | |
| 4,873,717 A * | 10/1989 | Davidson | H04Q 11/0428 379/142.01 |
| 4,878,843 A | 11/1989 | Kuch | |
| 4,926,459 A | 5/1990 | Advani et al. | |
| 4,951,311 A | 8/1990 | Sterr | |
| 4,953,205 A | 8/1990 | Yang | |
| 5,280,523 A | 1/1994 | Lee | |
| 5,404,399 A | 4/1995 | Finamore | |
| 5,570,421 A | 10/1996 | Morishima et al. | |
| 5,576,690 A | 11/1996 | Waugh et al. | |
| 5,602,908 A | 2/1997 | Fan | |
| 5,686,881 A | 11/1997 | Ridout | |
| 5,877,676 A | 3/1999 | Shankarappa | |
| 5,890,120 A | 3/1999 | Haskell et al. | |
| 5,946,636 A | 8/1999 | Uyeno et al. | |
| 5,990,878 A | 11/1999 | Ikeda et al. | |
| 6,016,038 A | 1/2000 | Mueller et al. | |
| D421,225 S | 2/2000 | Kelley | |
| 6,116,907 A | 9/2000 | Baker et al. | |
| 6,150,774 A | 11/2000 | Mueller et al. | |
| 6,166,496 A | 12/2000 | Lys et al. | |
| 6,186,003 B1 | 2/2001 | Kikuchi et al. | |
| 6,204,974 B1 | 3/2001 | Spitzer | |
| 6,211,626 B1 | 4/2001 | Lys et al. | |
| 6,222,913 B1 * | 4/2001 | Cho | H04M 3/42314 379/142.04 |
| 6,229,430 B1 | 5/2001 | Smith Dewey | |
| 6,317,716 B1 | 11/2001 | Braida et al. | |
| 6,340,868 B1 | 1/2002 | Lys et al. | |
| 6,349,001 B1 | 2/2002 | Spitzer | |
| 6,353,503 B1 | 3/2002 | Spitzer et al. | |
| 6,356,392 B1 | 3/2002 | Spitzer | |
| 6,384,982 B1 | 5/2002 | Spitzer | |
| 6,456,706 B1 | 9/2002 | Blood et al. | |
| 6,459,919 B1 | 10/2002 | Lys et al. | |
| 6,528,954 B1 | 3/2003 | Lys et al. | |
| 6,577,080 B2 | 6/2003 | Lys et al. | |
| 6,608,453 B2 | 8/2003 | Morgan et al. | |
| 6,618,099 B1 | 9/2003 | Spitzer | |
| 6,690,955 B1 | 2/2004 | Komiyama | |
| 6,693,630 B1 | 2/2004 | Siskind | |
| 6,714,637 B1 | 3/2004 | Kredo | |
| 6,717,376 B2 | 4/2004 | Lys et al. | |
| 6,720,745 B2 | 4/2004 | Lys et al. | |
| 6,724,354 B1 | 4/2004 | Spitzer et al. | |
| 6,775,014 B2 | 8/2004 | Foote et al. | |
| 6,788,011 B2 | 9/2004 | Mueller et al. | |
| 6,806,659 B1 | 10/2004 | Mueller et al. | |
| 6,806,959 B2 | 10/2004 | Tukker | |
| 6,882,713 B2 | 4/2005 | Sakai et al. | |
| 6,888,322 B2 | 5/2005 | Dowling et al. | |
| 6,897,624 B2 | 5/2005 | Lys et al. | |
| 6,975,079 B2 | 12/2005 | Lys et al. | |
| 7,076,276 B2 | 7/2006 | Kemppinen | |
| 7,085,358 B2 | 8/2006 | Ruckart | |
| 7,135,824 B2 | 11/2006 | Lys et al. | |
| 7,167,195 B2 | 1/2007 | Kimata et al. | |
| 7,186,003 B2 | 3/2007 | Dowling et al. | |
| 7,231,060 B2 | 6/2007 | Dowling et al. | |
| 7,242,152 B2 | 7/2007 | Dowling et al. | |
| 7,352,339 B2 | 4/2008 | Morgan et al. | |
| 7,385,359 B2 | 6/2008 | Dowling et al. | |
| 7,443,964 B2 | 10/2008 | Urban et al. | |
| 7,610,044 B2 | 10/2009 | Sindoni | |
| 7,642,730 B2 | 1/2010 | Dowling et al. | |
| 7,764,026 B2 | 7/2010 | Dowling et al. | |
| 7,769,141 B2 | 8/2010 | Cupal et al. | |
| 7,796,024 B2 | 9/2010 | Lynn et al. | |
| 7,929,657 B2 | 4/2011 | Muller et al. | |
| 7,929,955 B1 * | 4/2011 | Bonner | H04M 3/42068 455/414.1 |
| 8,494,134 B2 * | 7/2013 | Clark | H04M 3/42238 379/142.04 |
| 8,688,161 B2 | 4/2014 | Kies et al. | |
| 8,824,640 B1 | 9/2014 | Winsor et al. | |
| 8,831,578 B2 * | 9/2014 | Bonner | H04M 3/42068 455/414.1 |
| 8,942,674 B2 * | 1/2015 | Kumar | H04M 3/42042 379/88.11 |
| 8,976,940 B2 * | 3/2015 | Maxwell | H04M 3/02 379/376.01 |
| 9,191,789 B2 | 11/2015 | Pan | |
| 9,215,409 B2 | 12/2015 | Montero et al. | |
| 9,276,971 B1 | 3/2016 | Walker et al. | |
| 9,832,634 B2 * | 11/2017 | Cho, II | H04W 8/183 |
| 2002/0005781 A1 | 1/2002 | Britton | |
| 2002/0010767 A1 | 1/2002 | Farrow et al. | |
| 2002/0177112 A1 | 11/2002 | Heller | |
| 2002/0183098 A1 | 12/2002 | Lee et al. | |
| 2002/0196913 A1 | 12/2002 | Ruckart | |
| 2003/0228003 A1 | 12/2003 | Vardon | |
| 2004/0213401 A1 | 10/2004 | Aupperle et al. | |
| 2005/0031106 A1 | 2/2005 | Henderson | |
| 2005/0151489 A1 | 7/2005 | Lys et al. | |
| 2005/0213716 A1 | 9/2005 | Zhu et al. | |
| 2007/0064888 A1 * | 3/2007 | Nola | H04M 3/42391 379/142.06 |
| 2007/0081646 A1 * | 4/2007 | Cupal | H04M 3/02 379/142.06 |
| 2007/0112977 A1 | 5/2007 | Hornal et al. | |
| 2008/0167995 A1 | 7/2008 | Cue et al. | |
| 2008/0186199 A1 | 8/2008 | Lynn et al. | |
| 2009/0174759 A1 | 7/2009 | Yeh et al. | |
| 2009/0247128 A1 * | 10/2009 | Honda | H04W 8/205 455/411 |
| 2009/0310602 A1 | 12/2009 | Olshansky et al. | |
| 2010/0048190 A1 * | 2/2010 | Park | H04M 1/57 455/415 |
| 2010/0217837 A1 | 8/2010 | Ansari et al. | |
| 2011/0065321 A1 | 3/2011 | Wang | |
| 2012/0196580 A1 * | 8/2012 | Simmons | H04M 1/57 455/415 |
| 2014/0269675 A1 * | 9/2014 | Bugos | H04M 7/006 370/352 |

(56) References Cited

U.S. PATENT DOCUMENTS

2017/0011611 A1 1/2017 Ulfsparre et al.
2018/0054720 A1* 2/2018 Messenger ............ H04W 76/10

FOREIGN PATENT DOCUMENTS

| GB | 2383716 A | 7/2003 |
|---|---|---|
| WO | 2003077505 A2 | 9/2003 |
| WO | 2009088486 | 7/2009 |

OTHER PUBLICATIONS

Flash light alert color led!—Android Apps on Google Play; Google web search accessed Jul. 24, 2017; https://play.google.com/store/apps/details?Id=com.Fiash.alert.with.colors&hl=en, 3 pages.

Hern "Smart Bulb 'could prove revolutionary' for deaf people"; Article in Guardian dated Mar. 24, 2014; 3 pages; Accessed Jul. 20, 2017.

Home Automation Solutions, Home Automation Guide: "Flash the Lights When Phone Ringsl Smarthome"; accessed Jul. 21, 2017 at http://www.smarlhome.com/sh-solutions-flash-lighfs.when-phona-rings.html, Copyright 1995-2017, Smarthome, 5 pages.

You Tube Video "Make lights flash when phone rings" Search accessed Jul. 21, 2017 at https://youtu.be/tUnJkw-8PzY; 1 page.

Purple Communications, Inc., "Purple Communications teams with LIFX to deliver 'POP' light for deaf and hard-of-hearing individuals; Innovative Wi-Fi flasher bulb ensures customers never miss a call", Article dated Oct. 31, 2016, 2 pages.

Purple Communications, Inc., "Purple Communications teams with LIFX to deliver 'POP' light for deaf and hard-of-hearing individuals; Innovative Wi-Fi flasher bulb ensures customers never miss a call", Press Release dated Nov. 1, 2016, 2 pages.

Purple Communications, Inc., "Purple's POP: A Smart Light Bulb for Hard of Hearing People" Lightedtips Article dated Nov. 4, 2016, 5 pages.

Sparkes, "App flashes lights to help deaf users catch phone calls"; Article dated Oct. 1, 2014; Telegraph Media Group Limited 2017, 2 pages.

* cited by examiner

| | User Accounts | | User Devices | Callee ID Patterns | |
|---|---|---|---|---|---|
| 802a | Dad | 114a | Dad's Device | Pattern 1 | 304a |
| 802b | Mom | 114b | Mom's Device | Pattern 2 | 304b |
| 802c | Daughter | 114c | Daughter's Device | Pattern 3 | 304c |
| 802d | Son | 114d | Son's Device | Pattern 4 | 304d |

FIG. 8

SYSTEMS AND RELATED METHODS FOR VISUAL INDICATION OF CALLEE ID INFORMATION FOR AN INCOMING COMMUNICATION REQUEST IN A HEARING-IMPAIRED ENVIRONMENT

FIELD

The application relates to telecommunication systems such as those for hearing-impaired users, and more particularly, to visual indication of an occurrence of an event to a hearing-impaired person.

BACKGROUND

Communication systems for hearing-impaired individuals include a variety of communication devices and services that provide sign language interpretation during communication sessions. By way of example, Sorenson Communications® offers a variety of videophone devices and solutions that utilize the Sorenson Video Relay Service®. The use of indicators for identifying an incoming call to a communication device in a telecommunications system is commonplace. One predominant form of indicators utilizes an audible or sound-based mechanism (e.g., an audible ring or ring tone) for providing notification to a user. However, persons with hearing impairments may not be able to detect such audible indicators.

For hearing-impaired users, or in environments that are not conducive to audible indicator detection, visual indicators have been developed. One known visual-indication approach utilized by hearing-impaired users for identifying an incoming telephone call includes connecting a conventional telephone through a coupling circuit to a room lamp or other light source. The coupling circuit, upon detection of a telephone "ring" signal on a communication network, causes, for example, a room light or lamp to flash repeatedly when a ringing voltage or other signal designates an incoming call.

Telephone coupling circuits and single-light-source visual indicators have often been referred to as "flashers." Flashers or visual indicators may be implemented as a single light source located on or near the telephone or may be coupled to a more generally present light source, such as a light bulb or lamp in a room inhabited by a hearing-impaired user. While such visual indicators provide notification to a user, such visual indicators are "one dimensional" in information conveyed in that they provide only a notification of the occurrence of an event (e.g., the ringing of an incoming call).

Some conventional systems have incorporated a visual indication for an incoming call based on the origin of the call (i.e., the caller). Another conventional system provides visual indication for an incoming call based on the destination device for the incoming call (i.e., the callee). In the latter system, such visual indication may include connecting the telephone to Wi-Fi-enabled "smart" light bulbs. The smart light bulb is capable of flashing in one of a variety of different colors. Each color supported by the smart light bulb may be assigned to a connected device belonging to a member of a household. When an incoming call is received by one of the connected devices, the respective device causes the smart light bulb to flash according to the callee-assigned specific color, thus notifying members of the household not only that there is an incoming call, but also whom the call is for.

BRIEF SUMMARY

In some embodiments, the disclosure comprises a method of operating a video communication device configured to receive incoming communication to the at least two unique identifiers. The method comprises assigning, via a video relay service provider for hearing-impaired users, at least two unique identifiers to a single video communication device associated with a hearing-impaired user, receiving, via the video relay service, an incoming communication placed to one of the at least two unique identifiers assigned to the video communication device, and displaying a visual indicator pattern assigned to the one of the at least two unique identifier used when the incoming communication was placed by a far-end device.

In other embodiments, the disclosure includes a video communication device specifically configured for use by a hearing-impaired user. The video communication device comprises a visual indicator device, a memory device including a stored callee identification list including a plurality of entries of callee identification information linked to an assigned visual indicator pattern, and a processor operably coupled with the memory device and the visual indicator device, and configured to: receive an incoming communication request placed to one of at least two unique identifiers assigned to the video communication device by a single video relay service configured to provide translation services for hearing-impaired users, capture current callee identification information from the incoming communication request, and generate a visual effect with the visual indicator device according to the visual indicator pattern corresponding to callee identification information for the incoming communication.

In still other embodiments, the disclosure includes a method of indicating the occurrence of an incoming communication. The method comprises receiving an incoming communication to a unique identifier assigned to a first video communication device, displaying a first visual indicator corresponding indicative of the unique identifier used as a callee ID when placing the incoming communication, transmitting a wireless notification signal from the first communication device to a second communication device associated with a second user in proximity of the first communication device, and generating a second indicator by the second communication device, the second indicator indicative of the unique identifier for the first video communication device.

BRIEF DESCRIPTION OF THE DRAWINGS

FIG. 8 is a simplified block diagram of multiple user accounts, associated devices, and assigned callee identification patterns, in accordance with an embodiment of the disclosure.

DETAILED DESCRIPTION

Figure 1:
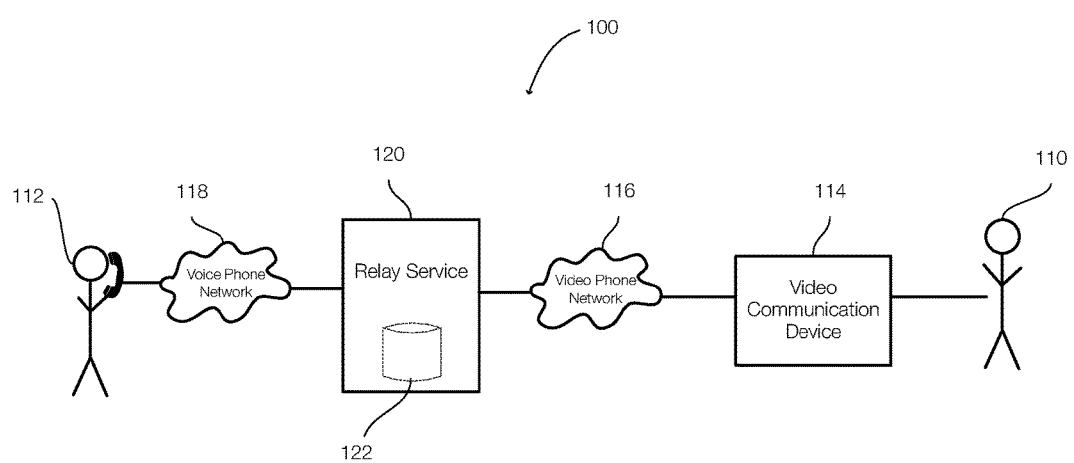
FIG. 1 is a simplified hearing-impaired video relay communication system, in accordance with an embodiment of the disclosure.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

The illustrations presented herein are not meant to be actual views of a particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

A processor herein may be any processor, controller, microcontroller, system on a chip, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a video relay service for providing sign language interpretation services to assist hearing-impaired users. Embodiments include features that improve the functionality of the communication device such that a new communication device and method for controlling a video communication device is provided. As a result, the interaction of the communication device with other systems may be improved in addition to an improved user experience.

In addition, the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be rearranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media (i.e., non-transitory media) and communication media including any medium that facilitates transfer of a computer program from one place to another.

It should be understood that any reference to an element herein using a designation as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110a). For ease of following the description, for the most part, element number indicators begin with the number of the drawing on which the elements are introduced or most fully discussed. Thus, for example, element identifiers of a FIG. 1 will be mostly the numerical format 1xx and elements on FIG. 4. will be mostly in the numerical format 4xx.

The term "incoming call" refers to an incoming communication to a communication device such as a portable communication device as well as less portable audio and video communication devices. Thus, incoming communication should be considered to include communications such as, for example, E-mail, text messages, instant messages, voice communications, and video communications.

Embodiments of the disclosure include systems and related methods for visually indicating an occurrence of an event. While the utility and application of the various embodiments of the disclosure are described with reference to a hearing-impaired environment, the disclosure also finds application to any environment where visually indicating an occurrence of an event may be helpful or desirable (e.g., a noisy environment).

Relay services provide assistance in a communication session between a hearing-capable user and a hearing-impaired user through a video relay service (VRS). A video communication device may be used by both the hearing-impaired user and the relay service interpreter (also referred to as a "communications assistant"). Many electronic devices for relaying communicative expressions of both hearing-capable and hearing-impaired users currently exist. These devices can include, but are not limited to, video phones, smart phones, tablet computers, desktop computers, laptop computers, web cameras and monitors, etc. The communicative expressions, such as sign language, may be interpreted by the video relay service, while a hearing-capable user may interact in a conventional manner with the video relay service through the use of a voice-based dialogue conveyed either over a conventional voice phone or another communication device.

FIG. 1 is a simplified schematic diagram of a hearing-impaired communication system 100 configured to facilitate a communication session between a hearing-impaired user 110 and a hearing-capable user 112 with the assistance of a sign language interpreter of a video relay service 120 according to an embodiment of the disclosure. The video relay service 120 enables a hearing-impaired user 110 to utilize a video communication device 114 to engage in conversation through a voice-based communication system with a hearing-capable user 112. A communication session between the users 110, 112 is facilitated through the use of various equipment through one or more networks. For example, a communication session may include establishing a first connection (e.g., over a voice phone network 118) between the device associated with the hearing-capable user 112 and the video relay service 120, and establishing a second connection (e.g., over a video phone network 116) between the video relay service 120 and the video communication device 114 associated with the hearing-impaired user 110. In some embodiments, the video phone network 116 may include an internet-based communication network, cellular networks, or other suitable network for facilitating video communication with the video relay service 120. The voice phone network 118 may include a Public Switch Telephone Network (PSTN) or other communication network suitable for facilitating voice communication with the video relay service 120 (e.g., including internet-based networks and/or cellular networks).

The video relay service 120 may be configured to facilitate communication sessions for a number of different users of the communication system 100. Thus, the video relay service 120 may include a user account database 122 that manages user profile information including devices assigned the various users of the system 100, such as user profile information (e.g., name, address, contact information, etc.) and device information (e.g., identifiers unique to each assigned device, additional VRS-assigned unique device identifiers, VRS-assigned group identifiers, etc.) Other databases (e.g., routing databases) may also be included as needed to facilitate communication sessions. Although FIG. 1 depicts a situation in which a communication session is facilitated between the hearing-impaired user 110 and a hearing-capable user 112, the communication system 100 may also be configured to enable point-to-point communication sessions between hearing-impaired users. Such a call may not require a sign language interpreter as each party to the call may be able to effectively communicate via sign language. Thus, incoming calls to the video communication device 114 may originate from hearing-capable users 112 or other hearing-impaired users 110.

To interface the video communication device 114 into a generally voice-based communication system, interpretive services are employed by the video relay service 120 allowing hearing-impaired users 110 to communicate with an interpreter, namely through sign language. The sign language images are then translated by the video relay service 120 and, when translated into voice information, are then forwarded over a voice-based communication connection to the hearing-capable user 112. The video communication device 114 is configured to relay the communicative expressions of a hearing-impaired user 110 within the hearing-impaired communication system. For example, the video communication device 114 may be configured to capture (e.g., with a camera) the communicative expressions exhibited by the hearing-impaired user 110 and to display (e.g., with an electronic display) interpreted information originating from the hearing-capable user 112 through the video relay service 120. The expressions, such as sign language and/or body language, may be interpreted or translated by video relay service 120. The hearing-capable user 112 interacts in a conventional manner with video relay service 120 through the use of a voice-based dialogue conveyed over a conventional voice phone.

A hearing-impaired user may be assigned multiple unique identifiers (ID) (e.g., phone numbers). In the VRS environment, each individual video communication device may be assigned its own unique ID to which calls may be placed through the video relay service 120. For example, the hearing-impaired user may have a tablet computer having a first unique ID, a standalone video phone having a second unique ID, and another standalone video phone having a third unique ID. Thus, a call placed to the first unique ID may be routed to the tablet computer to the exclusion of the hearing-impaired user's other devices.

In some embodiments, the video relay service 120 may assign multiple unique IDs to a single video communication device. For example, the video relay service 120 may assign a first unique ID, a second unique ID, and a third unique ID to the tablet computer. Thus, a call placed to any of the first unique ID, second unique ID, or third unique ID may be routed to the tablet computer to the exclusion of the hearing-impaired user's other devices. Doing so may be desirable for the hearing-impaired user who may desire to distribute each number to different people as desired in order to separate the individuals who are aware of each number. For example, it may be desirable for the hearing-impaired user to distribute each unique ID to people who fit within different life categories, such as the first unique ID to family, the second unique ID to work colleagues, and the third unique ID to everyone else. The hearing-impaired user may then link each ID to the different video communication devices, and define how the visual indicator is to be performed responsive to an incoming call being placed to each individual unique ID as will be discussed further below.

Figure 2:
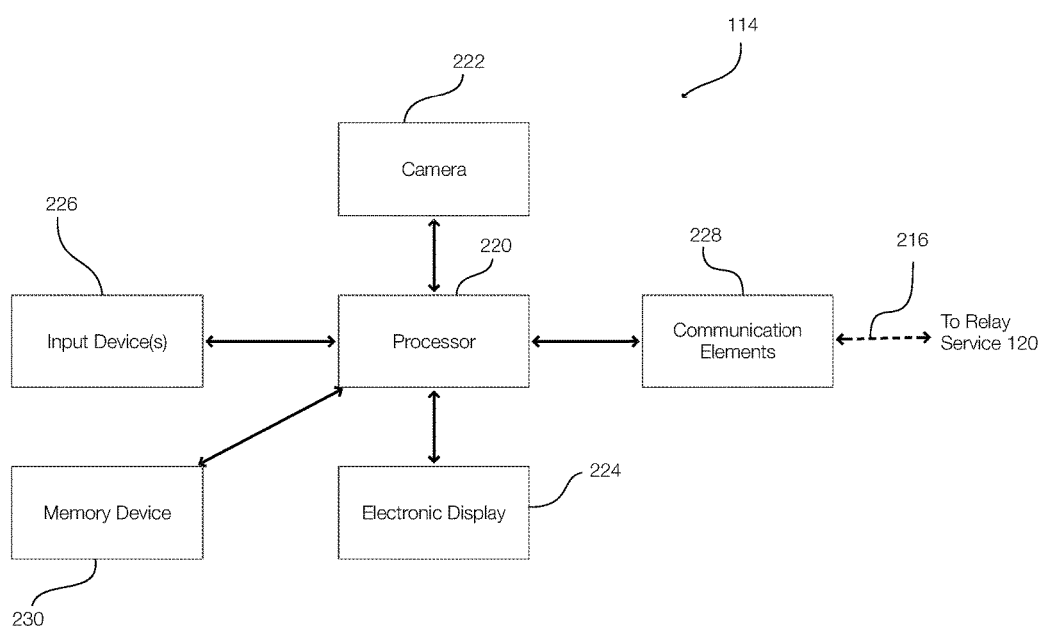
FIG. 2 is a simplified block diagram of the video communication device of FIG. 1, in accordance with an embodiment of the disclosure.

FIG. 2 is a simplified block diagram of the video communication device 114 of FIG. 1. The video communication device 114 may include a processor 220 operably coupled with a camera 222, an electronic display 224, input devices 226, one or more communication elements 228, and a memory device 230. The video communication device 102 may be configured to communicate video data 216 from the camera 222 to the video relay service 120 (FIG. 1) through the communication elements 228. The processor 220 may coordinate the communication between the various devices as well as execute instructions stored in computer-readable media of the memory device 230. The memory device 230 may include volatile and non-volatile memory storage. The video data 216 captured by the camera 222 may include sign language communication originated by the hearing-impaired user 110 (FIG. 1). The video communication device 114 may also be configured to receive video data 216 from the video relay service 120 through the communication elements 228 to be displayed by the electronic display 224. The video data 216 received by the video communication device 114 may include sign language communication originated by the call assistant at the video relay service 120.

The video communication device 114 may comprise a video phone or a mobile video phone. The video communication device 114 may also comprise a software endpoint configured to be accessed on devices configured to execute software commands, such as, for example, smart phones, tablet computers, desktop computers, laptop computers, HDMI sticks, set top devices coupled with a camera mounted to a video screen (e.g., computer monitor, television, etc.) For example, in some embodiments the camera 222 may be integrated into the video communication device 114 (e.g., a video phone, smart phone, tablet, etc.). As an example, the camera 222 may be similar to the cameras described in U.S. Pat. No. 8,976,220, entitled "Devices and methods for hosting a video call between a plurality of endpoints," issued Mar. 10, 2015, the disclosure of which is incorporated herein in its entirety by this reference. In other embodiments, the camera 222 may be separate from some of the components of the video communication device 114. For example, the camera 222 may be mounted to a display (e.g., a television) such that the display may serve as the electronic display 224 of the video communication device 114. The camera 222 may be similar to the remote camera described in U.S. Pat. No. 9,432,622, entitled "High-speed video interfaces, video endpoints, and related methods," issued Aug. 30, 2016, the disclosure of which is incorporated herein in its entireties by this reference.

As previously stated, visual indicators for conventional communication devices may provide utility to hearing-impaired individuals who may be physically incapable of effectively detecting audible sounds. Such visual indicators may indicate the existence of incoming calls and the origin of incoming calls (i.e., "caller ID"). In a VRS environment for hearing-impaired users, the video communication device 114 may be configured to convey caller ID information through visual effects. For example, the video communication device 114 may be configured to have a particular light pattern and/or color of light assigned to different contacts to identify who the caller is when an incoming call is received.

For the hearing-impaired person, still more information may be desirable. For example, in a home setting for a family that includes one or more hearing-impaired persons, the visual indication of an incoming call may alert anyone in the family within sight of the visual indicator that an incoming call is being received by someone in the family. Visual indication of an incoming call alone, however, is insufficient to notify the family members whose phone is actually ringing and whom the call is for. Thus, in addition to visual indication of incoming calls and the origin of incoming calls, visual indication of the destination of the incoming call (i.e., "callee ID") may also be desirable. In some embodiments, a visual indication having a combination of caller ID information and callee ID information may be generated. For example, the color of the light may depend on the source of the call indicating the caller ID, and a flashing pattern of the light may depend on the destination of the call indicating the callee ID. Of course, color may indicate callee ID and flashing pattern may indicate caller ID. Other combinations are also contemplated, including a vibration pattern in addition to the color and/or flashing pattern. For example, in some embodiments the vibration pattern and the flashing pattern may be synchronized in case the video phone is a smart phone that is in the user's pocket and the pattern can be felt rather than seen.

Figure 3:
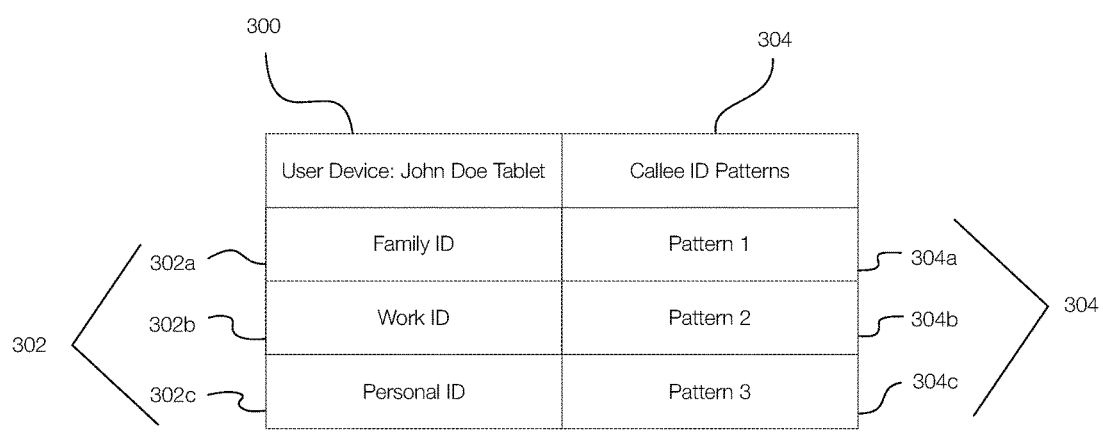
FIG. 3 is a simplified block diagram of a user account, in accordance with an embodiment of the disclosure.

FIG. 3 is a block diagram illustrating a simplified organization for a user account 300 associated with an individual hearing-impaired user according to an embodiment of the disclosure. As discussed above, the user account 300 may be managed by the video relay service 120 (FIG. 1) with information stored in a profile database 122 (FIG. 1) and/or other databases used by the video relay service 120. As discussed above, a VRS provider of the video relay service 120 may assign multiple unique identifiers 302 to the same user account 300. The different unique identifiers 302 may be helpful for the hearing-impaired user to separate different areas of his life as desired. For example, one of the unique identifiers 302 may be defined by the hearing-impaired user to be a family unique identifier 302a to distribute to members of his family. Another unique identifier 302 may be defined to be a work unique identifier 302b to distribute to work colleagues including co-workers, clients, business partners, etc. Another unique identifier 302 may be defined to be a personal unique identifier 302c that the hearing-impaired user 110 may distribute to others. Other categories of identifiers are also contemplated, and may be defined and distributed as desired by the hearing-impaired user 110. These unique identifiers 110 may be linked to one or more different video communication devices associated with the same hearing-impaired user 110. As an example, the unique identifiers 302 may also comprise unique group identifiers, as will be discussed further below. In accordance with embodiments of the disclosure, each of the unique identifiers 302 may be assigned the user and activated by a single VRS provider of the video relay service 120.

In some embodiments, the video relay service 120 may assign a unique callee identification pattern 304 to each unique identifier 302 assigned the user account 300. As an example, the first callee identification pattern 304a may be linked to the family unique ID 302a, the second callee identification pattern 304b may be linked to the work unique ID 302b, and the third callee identification pattern 304c may be linked to the family unique ID 302c. The hearing-impaired 110 user may assign a unique callee identification pattern 304 to each unique identifier 302 assigned to the user account 300. The hearing-impaired user 110 may assign a unique callee identification pattern 304 to each unique identifier 302 assigned to her account using a web-based client, web portal, using an application installed on the video communication device 114, or software installed on a computer or tablet.

Figure 4A:
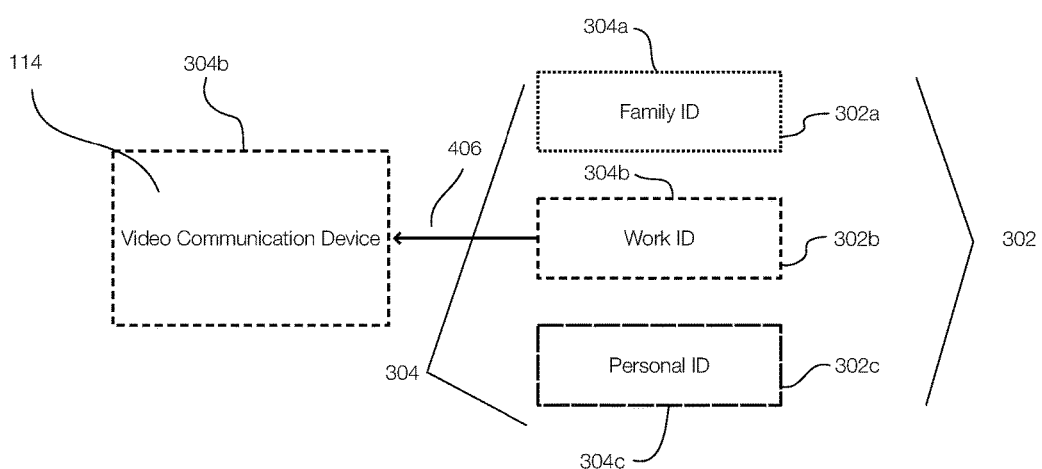
FIGS. 4A-4C show a video communication device may be configured to receive calls to any of at least two unique identifiers, in accordance with an embodiment of the disclosure.
Figure 4B:
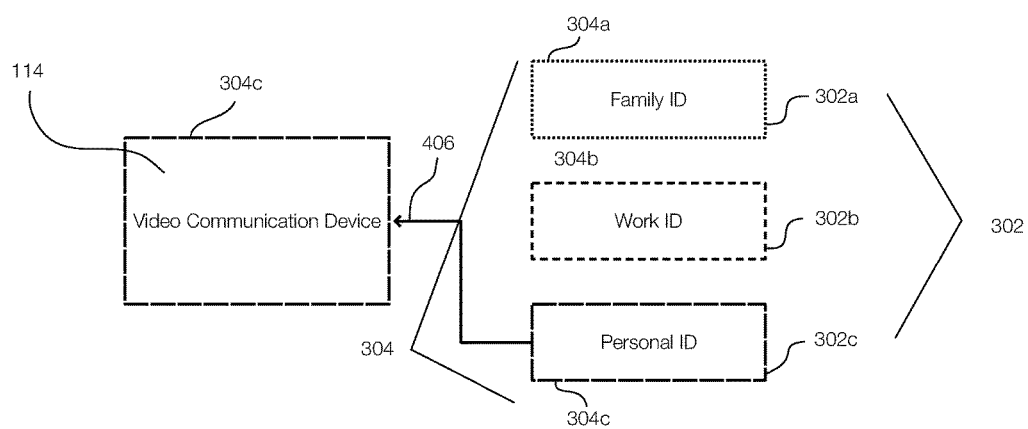
Figure 4C:
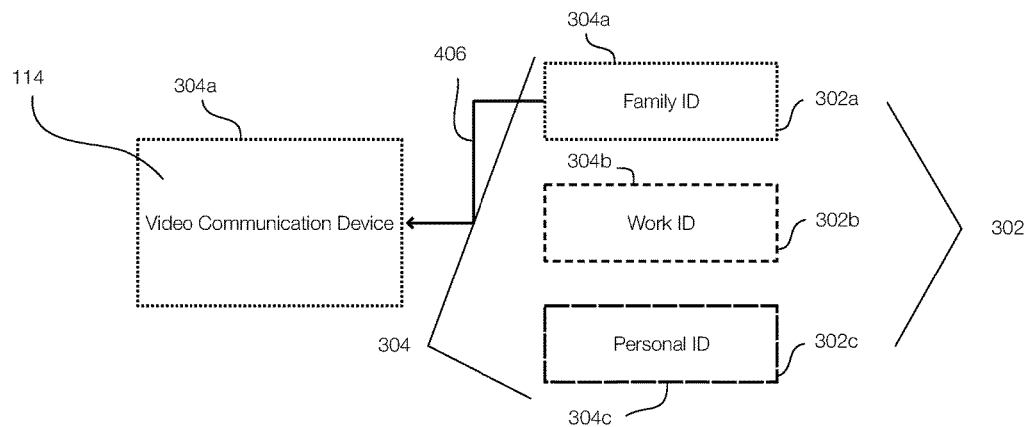

FIGS. 4A through 4C are block diagrams showing a video communication device 114 receiving an incoming call according to an embodiment of the disclosure. The video communication device 114 may be configured to receive incoming calls when a caller dials any of the at least two unique identifiers 302. The video communication device 114 may be configured to display a visual indicator pattern 304 when the video communication device 114 receives an incoming call 406 to one of the at least two unique identifiers 302. The outer border of each box represents a visual indicator pattern 304 for a call placed to one of the unique call identifiers 302. In FIG. 4A, the patterned line around the Work ID box 304b matches the patterned line around the Video Communication Device box 304b. The matching of the patterned lines is representative of the video communication device 114 displaying a visual indicator pattern 304b assigned, in this case, to the work unique identifier 302b when a caller dials the work unique identifier 302b. FIG. 4B shows the video communication device 114 displaying a visual indicator pattern 304c when a caller dials the personal unique identifier 302c. Likewise, FIG. 4C shows the video communication device 114 displaying a visual indicator pattern 304a when a caller dials the family unique identifier 302a.

In operation, the same video communication device 114 may display a first visual indicator pattern 304a responsive to the family unique identifier 302a being dialed (see FIG. 4C), a second visual indicator pattern 304b responsive to the work unique identifier 302b being dialed (see FIG. 4A), and a third visual indicator pattern 304c responsive to the personal unique identifier 302c being dialed. Thus, the hearing-impaired user 110 may know when she is alerted by the first visual indicator pattern 304a that the call has been placed by someone using the family ID 302a. Thus, the call may be more casual in nature, which in case it is a Saturday morning, and perhaps she may feel comfortable answering the video call without changing out of her pajamas. Alternatively, the hearing-impaired user 110 may know when she is alerted by the second visual indicator pattern 302b that the call has been placed by someone using the work ID 302b. Thus, the call may be more professional in nature, which perhaps she may feel more comfortable answering the video call when she is more prepared (e.g., changing her clothes, tidying the room, moving to another location, etc.) before answering the video call.

As discussed above, each of the unique identifiers 302 may be assigned a unique visual indicator pattern 304. In some embodiments, the visual indicator pattern 304 may be a color of the light illuminated by the visual indicator device. In other embodiments, the visual indicator pattern 304 may include a series of flashing lights. In still other embodiments the visual indicator pattern 304 may include a series of vibrations. In further embodiments, the visual indicator pattern 304 may include a combination of a color, a series of colors, a series of flashing lights, and/or a series of vibrations.

In accordance with the disclosure, the hearing-impaired user 110 may create and assign a particular feature of the visual indicator pattern 304 to each of the unique identifiers 302 assigned by the VRS provider. In a non-limiting example, the user may assign the color red to the family unique identifier 302a, the color blue to the work unique identifier 302b, and the color green to the personal unique identifier 302c. Thus, when an outside caller dials the user's family unique identifier 302a the video communication device 114 may display the color red, when a caller dials the user's work unique identifier 302b the video communication device 114 may display the color blue, and when a caller dials the user's personal unique identifier 302c, the video communication device 114 may display the color green.

In another non-limiting example, the hearing-impaired user 110 may assign a particular feature of the visual indicator patter 304 to specific contacts(e.g., her mother). As an example, the following flashing pattern may be assigned to calls originating from the user's mother: short, short, long. Thus, responsive to the user's mother calling the family ID 302a, the user's video communication device 114 generate a visual indicator that displays a red flashing light with the following pattern: short, short, long. Thus, when alerted, the user may know a family member is calling because the color is red and that that the family member is her mother because the pattern is: short, short, long. The user's boss calling the work ID 302b may cause the video communication device to generate a different visual indicator displaying a blue light with a different pattern assigned to the user's boss' phone number.

In some embodiments, there may be multiple hearing-impaired users living in the same area (e.g., a family setting, roommate, etc.). In accordance with the disclosure, users in the same area may, via software installed on their own video communication devices, and utilizing combinations of flashes, colors, and vibrations, create visual indicator patterns 304 and assign those visual indicator patterns 304 to each member of the household, to areas of each household member's life, and to specific contacts.

Figure 5:
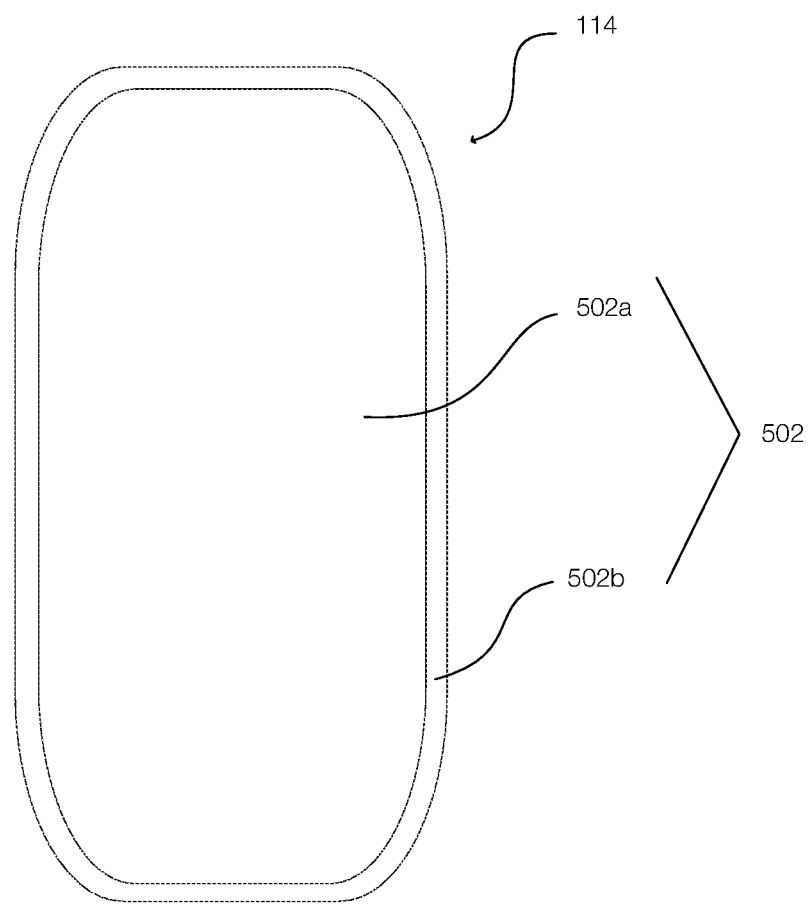
FIG. 5 is a video communication device, in accordance with an embodiment of the disclosure.

FIG. 5 shows a video communication device 114, in accordance with embodiments of the disclosure. The video communication device 114 may include at least one visual indicator device 502. The visual indicator device 502 may comprise the electronic display 502a (e.g., touch screen display) of video phone, smart phone, tablet computer, computer, television, or other video communication device. The visual indicator device 502 may also comprise other devices, for example, a light ring 502b and/or a camera flash incorporated within the video communication device 114. In some embodiments, the visual indicator device 502 may still further comprise smart light bulbs or LED displays used in lighting fixtures or standalone objects wirelessly coupled with the video communication device 114.

In some embodiments, software may be installed on the video communication device 114, by which the hearing-impaired user 110 may create visual indicator patterns 304 and assign a visual indicator pattern 304 to the different unique identifiers 302 and/or contacts to indicate callee ID, caller ID, or a combination thereof. In a non-limiting example, the software may utilize the display 502a of the video communication device 114 to display a color, a pattern of colors, and/or flashes. In another example, many video phones may include onboard cameras with a camera flash. The software may utilize the camera flash to display a unique visual indicator. In still another example, many video phones may include vibration devices. The software may utilize the vibrators of the video communication device 114 to display a visual and/or tactical indicator pattern 304. In other embodiments, the video communication device may have additional visual indicator devices 502 (e.g., flasher, light ring, etc.) for displaying visual indicator patterns 304. In such embodiments, the video communication device 114 may transmit the instructions or other signal to the separate device to control how the separate device renders the indicator pattern according to the callee ID, caller ID, or combination thereof for the incoming call.

A non-limiting example of an additional visual indicator device 502 may include a light ring 502b which may surround the periphery of the display 502a as shown in FIG. 5. Additional methods, apparatuses, and devices for creating or sharing a visual indicator pattern for indicating a condition of an incoming communication are described in U.S. Pat. No. 8,824,640 to Winsor et al., entitled, "Methods, Devices and Systems for Creating or Sharing a Visual Indicator Pattern," issued Sep. 2, 2104, U.S. Pat. No. 7,769,141 to Cupal et al., entitled, "Method and System for Visual Spatial Caller Identification," issued Aug. 3, 2010, and U.S. Pat. No. 8,976,940 to Maxwell et al., entitled, "Systems and Related Methods for Visual Indication of an Occurrence of an Event," issued Mar. 10, 2015, the entire disclosures of each of which are incorporated herein in their entirety by this reference. The light ring 502b may comprise a storage device configured to store a plurality of visual indicator patterns 304 and a plurality of possible conditions of an incoming communication; and a spatial visual indicator configured to display the plurality of visual indicator patterns 304. The light ring 502*b* may further comprise a control circuit, configured to detect a current condition of the incoming communication (e.g., the source ID of the call, the destination ID of the call); compare the current condition with the plurality of possible conditions; and direct the spatial visual indicator to display a visual indicator pattern 304 assigned to a condition of the plurality of possible conditions that matches the current condition. The spatial visual indicator may further comprise a plurality of illuminable elements. The plurality of illuminable elements may be configured for at least one of a color, one of color-varying, and brightness varying. The plurality of illuminable elements may comprise a plurality of red green blue (RGB) light emitting diodes (LEDs).

Figure 6:
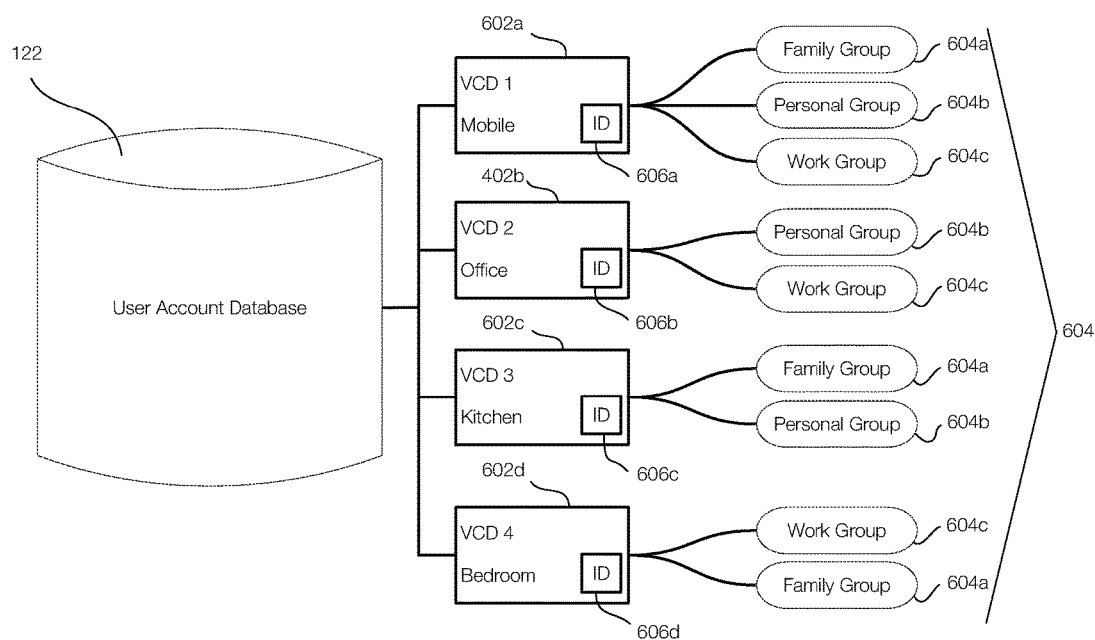
FIG. 6 is a simplified block diagram of a user account database according to an embodiment of the disclosure.

FIG. 6 shows a user account database 122, which contains user profile information including video communication devices assigned to the user, identifiers unique to each assigned video communication device, additional VRS-assigned unique identifiers, VRS-assigned group identifiers, etc. As a non-limiting example, FIG. 6 shows a user account database 122 containing four video communication devices ("VCDs"), i.e., VCD 1-4 602*a-d*. Each VCD 602*a-d* is assigned its own unique identifier 606*a-d*. Additionally, each VCD 602*a-d* may be assigned one or more group identifiers 604. By way of non-limiting example, group identifiers 604 may include: a family group identifier 604*a*, a personal group identifier 604*b*, and/or a work group identifier 604*c*, as shown in FIG. 6. In some embodiments, one or more of the unique identifiers 302, as described above, may actually be unique group identifiers 604. Additional methods, systems, and devices having multiple unique and group identifiers are discussed in U.S. Pat. No. 9,294,423 to Parent et al., entitled, "Communication Systems and Related Methods for Notifying Devices Having a Plurality of Unique Identifiers About Missed Communications," issued Mar. 21, 2016, U.S. Pat. No. 9,491,205 to Shields, entitled, "Communication Systems and Related Methods for Communicating with Devices Having a Plurality of Unique Identifiers," issued Nov. 8, 2016, U.S. Pat. No. 9,204,088 to Parent et al., entitled, "Systems Including and Methods of Operating Communication Devices Assigned Individual and Group Identities," issued Dec. 1, 2015, U.S. Pat. No. 9,325,753 to Walters et al., entitled, "User Interface for Creating and Administering a User Group, and Methods for Operating Such," issued Apr. 26, 2016, and Publication No. 2014/0282041A1, entitled, "Systems, Methods, and Devices for Replacing a Contact Entry Corresponding to a Communication Device With a Contact Entry Corresponding to a User Group," published Sep. 18, 2014, the disclosures of each of which are incorporated herein in their entirety by this reference.

Figure 7:
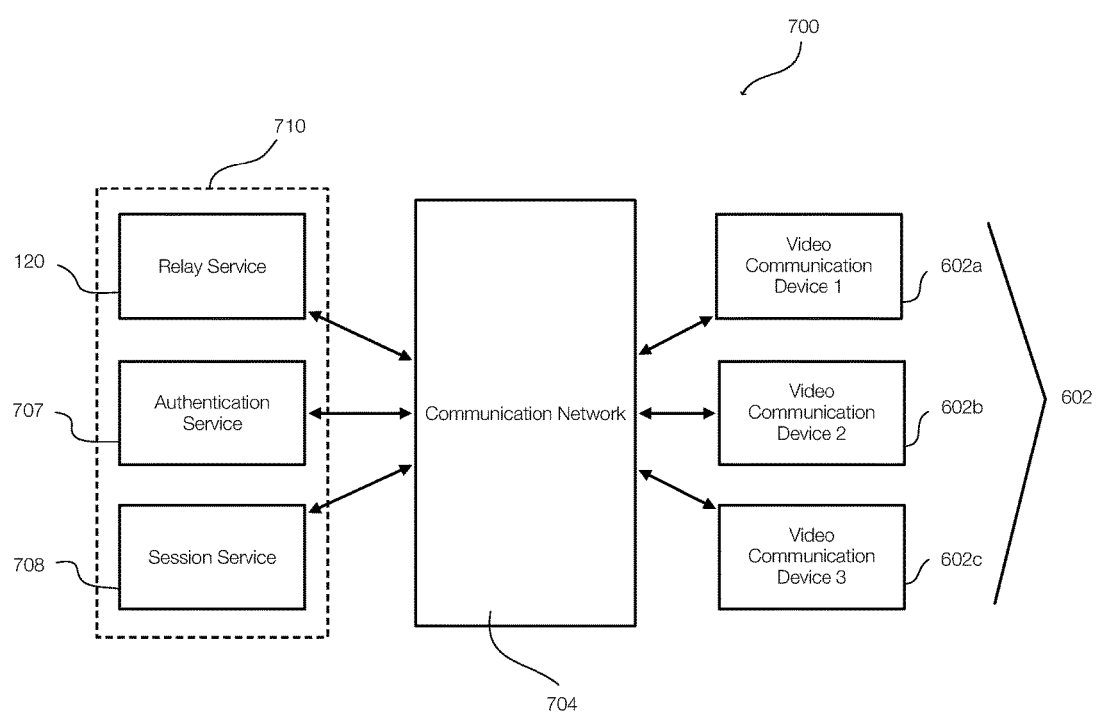
FIG. 7 is a simplified block diagram of a communication system according to an embodiment of the disclosure.

FIG. 7 is a simplified block diagram of a communication system 700 according to an embodiment of the disclosure. The communication system 700 may include a plurality of video communication devices 602 specifically configured for use by hearing-impaired users. The video communication devices 602 may be mobile devices or stationary devices. The communication system 700 may also include a communication network 704 and one or more servers 710. Each of the plurality of video communication devices 602 may comprise video phones for hearing-impaired users. Although FIG. 7 shows three video communication devices 602*a-c*, any number of communication devices are contemplated. Additional examples of communication devices are described in U.S. Pat. No. 8,978,112 to Brooksby et al., entitled, "Methods, Devices, and Systems for Remotely Controlling a Plurality of Communication Devices," issued Mar. 10, 2015, the disclosure of which is incorporated herein in its entirety by this reference.

Each of the plurality of communication devices 602 may be placed in different locations in or around a building. By way of non-limiting example, the plurality of communication devices 602 may be placed in a different room of a home. One or more of the plurality of communication devices 602 may additionally be placed in locations remote from other of the plurality of communication devices 602, such as different buildings. By non-limiting example, one or more communication devices 602 may be located a user's home, and another communication device may be located at the user's place of employment.

Each of the plurality of communication devices 602 may be configured to connect to one or more servers 710 through the communication network 704. The communication network 704 may comprise any one or combination of a personal area network (PAN), a local area network (LAN), a wide area network (WAN), or other kind of network.

The one or more servers 710 may be configured to provide services to the one or more video communication devices 602. The one or more servers 710 may include a relay service 120 as further described in U.S. Pat. No. 8,978,112. The video relay service 120 may be configured to connect to the communication network 704.

The one or more servers 710 may also include an authentication service 707, which may be configured to authenticate the user, allowing the user to control the functionality of the video communication device 114 and/or access services provided by the one or more servers 710. The authentication service 707 may be connected to the communication network 704.

The one or more servers 710 may include a session service 708 as described further in U.S. Pat. No. 8,978,112. The session service 708 may be connected to the communication network 704.

Each of the plurality of VCDs 602 may be configured to connect to the authentication service 707 through the communication network 704. Each of the plurality of VCDs 602 may also be configured to send a request to the authentication service 707 to obtain permission to connect to and control at least one of the other VCDs of the plurality of VCDs 602. Each of the plurality of VCDs 602 may additionally connect to the authentication service 707 through a first network (not shown), and to the at least one of the other VCDs of the plurality of VCDs 602 through a second network (not shown). As a non-limiting example, the first network may be a "wi-fi" type network and the second network may be a Bluetooth type network.

It may be desirable for the visual indicator patterns 304 to be visible to the user from more than one video communication device 114, but rather from a plurality of video communication devices 602 and services within the user's home. Repetition of the visual indicator pattern 304 across a plurality of VCDs 602 throughout the user's home and/or office will improve the likelihood that the user will know that he or she is receiving an incoming call. Therefore, the VCDs 602*a-d* of FIG. 7 may be included in the communication system 700 as shown in FIG. 7. In some embodiments, the user may receive an incoming call to one of at least two unique group identifiers 604 in his user account database 122; the video relay service 120 may send a signal to each video communication device 114 linked to the one of at the least two group identifiers 604 in the user account database 122; and each video communication device may, upon reception of the signal, display the visual indicator pattern 304 assigned to the one of the at least two group identifiers 604 (FIG. 6). By way of a non-limiting example, a caller may dial the family group identifier 604*a*, the video relay service 120 may send a signal via the communication network 704 to VCD 1 602*a*, VCD 3 602*c*, and VCD 4 602*d*, but not VCD 2 602*b*. Receipt of the signal may cause each of VCDs 1, 3, and 4 to display the visual indicator pattern 304 assigned to the unique family group identifier 604*a*. Thus, the user may be alerted on all the devices, VCDs 1, 3, and 4, which the user has linked with the family group identifier 604*a*, that a family member is calling because each device is displaying the same visual indicator pattern 304 assigned to the unique family group identifier 604*a*.

The visual indicator patterns 304 may not be limited to video communication devices 114. In some embodiments, software may be installed on the video communication device by which the user 110 may enable the video communication device 114 to control third-party devices including, for example, wireless smart light bulbs, LED devices, etc. that permit video communication devices link the device through software installed on the video communication device and a wireless network, including Bluetooth, a local area network (LAN), personal area network (PAN), or other network.

A user 110 may create and assign a visual indicator pattern 304 to a unique group identifier 604 using software installed on a first video communication device 602*a*. Once the visual indicator pattern 304 is created and assigned to the unique group identifier 604 on the first video communication device 602*a*, the first video communication device may communicate with the user's second and third video communication devices 602*b*, 602*c* via the communication network 704, or some other network, and share the created and assigned visual indicator pattern 304 with the user's second and third video communication devices 602*b*-*c*. Thus, a visual indicator pattern 304 created and assigned on one of the user's video communication devices 602, will function on all of the user's video communication devices 602, without having to create and assign the same visual indicator pattern 304 on each device separately. This also prevents a unique identifier 302 from being assigned more than one visual indicator pattern 304.

It may be desirable to further alert every member of a household that a member of the household is receiving a call. There may be times when a member of the household may be receiving a call, but may not be near one of his or her devices. In some embodiments, other members of the household may be better enabled to help the member of the household realize that he or she is receiving a call. In such an embodiment, Other household members' devices may also be configured to receive notifications for some or all of incoming calls to household members when in proximity to each other.

FIG. 8 shows multiple user accounts 802 belonging to members of a family (i.e., Dad 802*a*, Mom 802*b*, Daughter 802*c*, and Son 802*d*). Each member of the family may have one or more video communication devices 114 and each member of the family may be assigned a unique callee ID pattern 304. Each of the user accounts 802 may be linked by the video relay service, which may be managed by the users through a software application installed on one or more of the video communication devices 114, through a web portal, etc. In some embodiments all household devices may be linked so that when a first member of the household receives an incoming call all other household members receive a notification on their personal devices that the first household member is receiving an incoming call. In some embodiments, the different devices in the household may communicate such callee ID information with each other (e.g., via Bluetooth, a local area network, a cellular network, or other network), while other embodiments may receive such information from the video relay service.

Figure 9A:
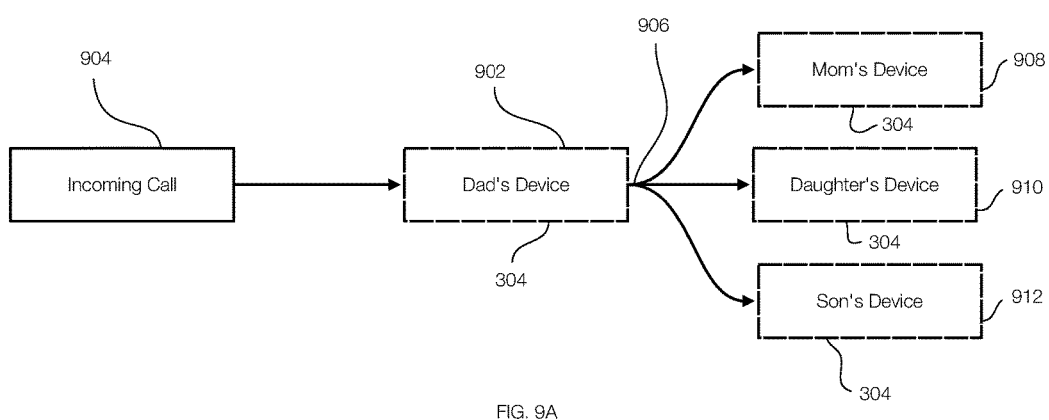
FIGS. 9A and 9B show a video communication device may be configured to send a notification signal to other communication devices that the video communication device is receiving an incoming call, in accordance with an embodiment of the disclosure.

FIG. 9A shows Dad's device 902 receiving an incoming call 904 according to an embodiment of the disclosure. Responsive to the incoming call, Dad's device 902 transmits a callee ID notification signal 906 via a wireless network to Mom's device 908, Daughter's device 910, and Son's device 912. As a result, Mom's device 908, Daughter's device 910, and Son's device 912 may all display a callee ID visual indicator pattern 304 assigned Dad, thus notifying Mom, Daughter, Son that Dad is receiving an incoming call 904 on his device 902.

Figure 9B:
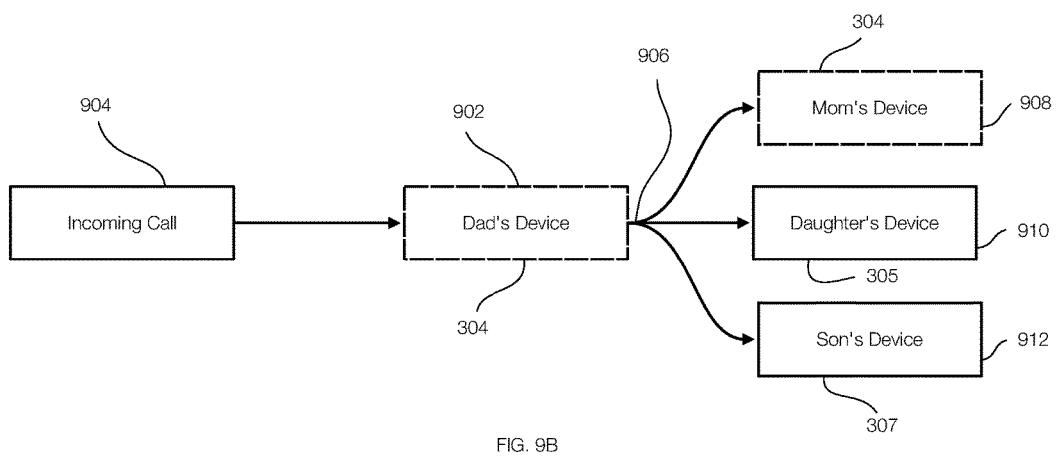
Figure 10:
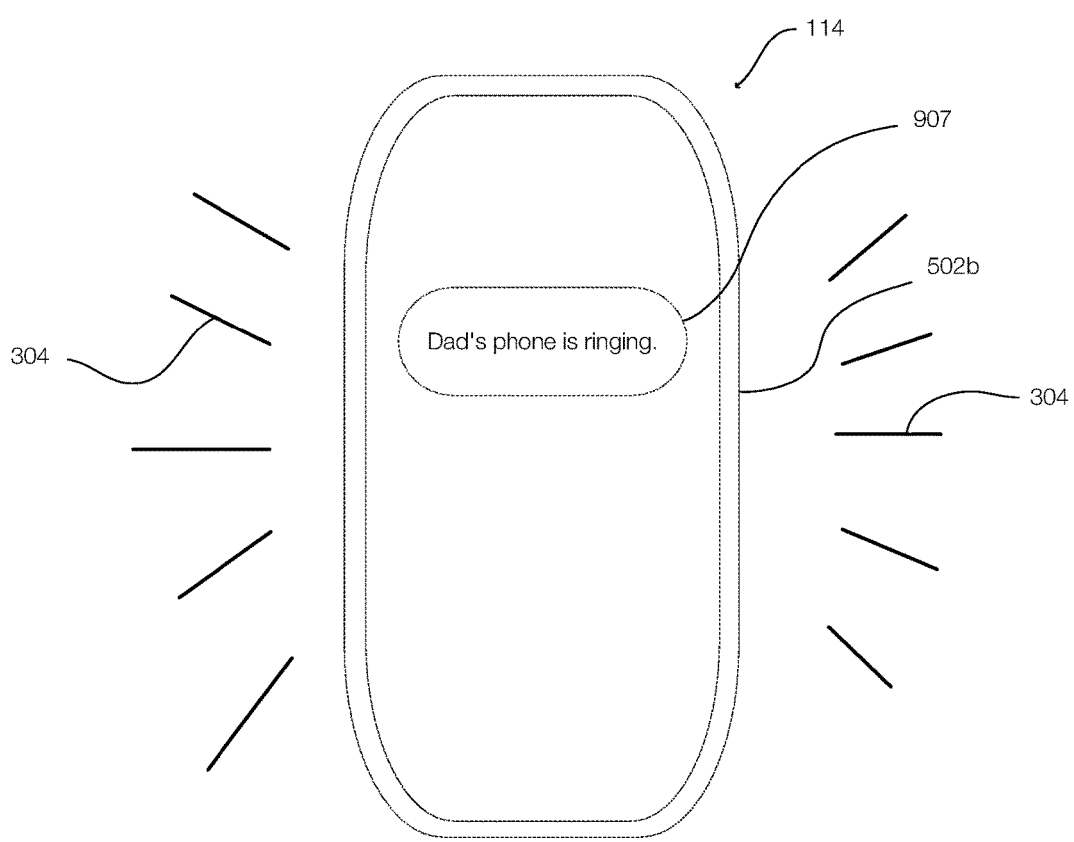
FIG. 10 is a video communication device receiving a notification signal, in accordance with an embodiment of the disclosure.

FIG. 9B also shows Dad's device 902 receiving an incoming call 904 according to another embodiment of the disclosure. While FIG. 9A shows each of the devices 908, 910, 912 showing the same visual indicator pattern, other patterns may be displayed by different devices that may still be interpreted by the respective owner as corresponding to a call being received by Dad's Device 902. For example, as shown in FIG. 9B Mom's device 908, Daughter's device 910, and Son's device are not all displaying the same visual indicator pattern. Responsive to receiving the incoming call 904, Dad's device 902 displays the visual indicator pattern 304 assigned to the unique identifier 302 dialed by the caller, as discussed above. Dad's device 902 also sends a wireless notification signal 906 to Mom's device 908, Daughter's device 910, and Son's device 912. Mom's device 908 receives the wireless notification signal 906 and displays the same visual indicator pattern 304 as is displayed on Dad's device. Daughter's and Son's devices 910, 912 may be configured to display a different visual indicator pattern (not shown). In some embodiments, not all members of the household may be hearing impaired. For example, consider that Daughter is hearing-capable. In such an embodiment, Daughter's device 910 may instead be configured to receive an audible indicator 305 responsive to the wireless notification signal 906 received when Dad is receiving an incoming call. In some embodiments, other forms of notification may be presented as desired by the owner of the respective device. For example, the Son may prefer to display the notification as a text message 307 or other text based notification responsive to receiving the wireless notification signal 906 when Dad is receiving a call. In some embodiments, all members of a household may be enabled, whether hearing-impaired or hearing-capable, to help each other know when a member of the household is receiving an incoming call. The notifications may be a visual indicator 304, a vibration pattern, an audible indicator 305, and/or a text message 307. FIG. 10 shows, by way of non-limiting example, a video communication device 114 displaying a visual indicator pattern 304 via a light ring 502*b* and displaying a text message 307 or other push notification stating a message, such as "Dad's phone is ringing."

The wireless notification signal 906 of FIGS. 9A and 9B may be communicated via Bluetooth, a local area network, a cellular network, or other network. In some embodiments, members of the household may use software installed on at least one video communication device to add other household members devices who may desire to receive notifications that the at least one video communication device is receiving an incoming call. In some embodiments, the other household members may, via software installed on their own communication devices, turn notifications from the at least one video communication device on or off In other embodiments, a first user may have to send a second user an invitation, which the second user may be required to accept before the first user's device may be able send, and the second user's device may be able to receive, the wireless notification signal 906.

In some embodiments, a first household member receiving the wireless notification signal 906 that a second member of the household is receiving a call does not allow the first household member to answer the incoming call on their own device for the second household member. For example, when Mom, Daughter, and Son receive the wireless notification signal 906 indicating that Dad is receiving a call, Mom, Daughter, and Son are unable to answer Dad's call on Mom's, Daughter's, or Son's device. Mom, Daughter, and Son may receive a notification when Dad is receiving a call, but Mom, Daughter, and Son are not able to connect Dad's call on their own devices. In accordance with this embodiment, the call could only be connected on one of Dad's devices.

In some situations, it may not be desirable that every member of the household be notified of every other household members' incoming calls every moment of every day. For example, it may not be desired or even helpful for the Son's Device 912 to receive and display notification that Dad's Device 902 is receiving an incoming call while Dad and Son are not in the same proximity (e.g., Dad is at work and Son is at school). However, it may be helpful for Son to receive a notification that Dad is receiving an incoming call if Son and Dad are both in the same proximity (e.g., at home, at a basketball game together, etc.) Thus, the devices may be configured to communicate wireless notification signals 906 with each other only when within a threshold level of proximity with each other.

In some embodiments, the threshold level of proximity may be determined based on the connection itself being used by the devices to communicate with each other. For example, a local area network or Bluetooth connection may be used to communicate the wireless notification signal 906 between devices. Thus, in one embodiment a first video communication device may only be able to send the wireless notification signal 906 to a second communication device if the second communication device is within range of the Bluetooth connection or other local network connection.

In some embodiments, the threshold level of proximity may be determined based on geolocational information for each of the linked communication devices. For example, each video communication device be GPS enabled such that GPS data may be known for each device. In some embodiments, the GPS data may be periodically transmitted to each communication device such that the location of each communication device is known for determining which devices are within the threshold level of proximity when an incoming call is received. As a result, software installed on a first video communication device may compare the GPS data, or other geolocational data, of the first video communication device with the GPS data, or other geolocational data, of the second device to determine whether the wireless notification signal 906 is sent responsive to an incoming call. In some embodiments, the wireless notification signal 906 may be sent from the first communication device to the second communication device along with its GPS data such that the second communication device may perform the proximity determination and whether or not to display the visual indicator pattern depending on being within the threshold. In such embodiments, the wireless notification signal 906 may be sent via a wide area network (e.g., Internet connection such as 3G, LTE, 5G, etc. networks) or a cellular network.

In some embodiments, many of the features discussed above, including caller ID, callee ID, and area-of-life ID, may rendered serially in for the indicator pattern. For example, Son may also have assigned the color red as his callee ID. A specific pattern may also be assigned to his dad as the caller ID. Thus, a call from Dad to Son may cause the visual indicator to first flash red indicating the Son's device is receiving the incoming call, and then display the pattern assigned to his Dad indicating the Dad is the caller.

In some embodiments, many of the features discussed above, including caller ID, callee ID, and area-of-life ID, may be combined together. By way of non-limiting example, Son may have assigned the color blue assigned to himself Thus, in his household the color blue may indicate an incoming call for Son. Son may also have assigned the color green to the work area of his life. Thus, the combination of the colors blue and green may indicate that an incoming call is for Son and that the incoming call concerns Son's work. Finally, Son may have assigned a flashing light pattern delta to his boss. Thus, the combination of the colors blue and green flashing the delta pattern may indicate that the incoming call is for Son, concerns Son's work, and, more specifically, that Son's boss is calling.

In other embodiments some or all of the caller, callee, and area-of-life information may be communicated throughout a household. With reference to the non-limiting example above, Son's device may display caller, callee, and area-of-life information, while other visual indicators in the home, for example a smart light bulb, may only display callee information (i.e., the color blue) indicating that Son has an incoming call. Other combinations of colors, flashing patterns, and vibrations to indicate callee ID, caller ID, and area-of-life information are contemplated and within the scope of this disclosure.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A method of operating a video communication device configured to receive incoming communication to at least two unique identifiers, the method comprising:
assigning, via a video relay service provider for hearing-impaired users, at least two unique identifiers to a single video communication device associated with a hearing-impaired user;
receiving, via the video relay service, an incoming communication placed to one of the at least two unique identifiers assigned to the video communication device;
capturing current callee identification information from the incoming communication; and
displaying a visual indicator pattern assigned to the one of the at least two unique identifiers corresponding to the callee identification information for the incoming communication when the incoming communication was placed by a far-end device.

2. The method of claim 1, wherein the video communication device comprises a video phone.

3. The method of claim 1, wherein the visual indicator pattern comprises a different color of light depending on which unique identifier was used when the incoming communication was placed.

4. The method of claim 3, wherein the visual indicator pattern comprises a unique flash pattern of light combined with the selected color.

5. The method of claim 4, wherein the unique flash pattern of light is indicative of origin of the incoming communication and the selected color of light is indicative of a destination of the incoming communication.

6. The method of claim 1, further comprising vibrating the video communication device with a unique vibration pattern assigned to the one of the at least two unique identifiers used when the incoming communication was placed.

7. The method of claim 1, further comprising vibrating the video communication device with a unique vibration pattern indicative of a source of the incoming communication.

8. The method of claim 7, wherein the visual indicator pattern comprises a combination of a unique color of light, a unique flash pattern of light, and a unique vibration pattern of the video communication device indicating a combination of both a callee and a caller of the incoming communication.

9. The method of claim 1, wherein the at least two unique identifiers may comprise unique group identifiers.

10. The method of claim 1, further comprising defining the visual indicator pattern by receiving inputs through the video communication device from the hearing-impaired user.

11. The method of claim 1, wherein displaying the visual indicator pattern comprises displaying the visual indicator pattern through an electronic display of the video communication device.

12. The method of claim 1, wherein displaying the visual indicator pattern comprises displaying the visual indicator pattern through at least one smart light bulb.

13. A video communication device specifically configured for use by a hearing-impaired user, the video communication device comprising:
   a visual indicator device;
   a memory device including a stored callee identification list including a plurality of entries of callee identification information linked to an assigned visual indicator pattern; and
   a processor operably coupled with the memory device and the visual indicator device, and configured to:
      receive an incoming communication request placed to one of at least two unique identifiers assigned to the video communication device by a single video relay service configured to provide translation services for hearing-impaired users;
      capture current callee identification information from the incoming communication request; and
      generate a visual effect with the visual indicator device according to the visual indicator pattern corresponding to callee identification information for the incoming communication.

14. The video communication device of claim 13, wherein the processor is further configured to cause the visual indicator patterns to be shared with other connected communication devices over a communication network.

15. The video communication device of claim 14, wherein the processor is further configured to generate a user interface configured to enable the user to create and link visual indicator patterns with callee information stored in the storage device.

16. A method of indicating the occurrence of an incoming communication, the method comprising:
   receiving an incoming communication to a unique identifier assigned to a first video communication device;
   displaying a first visual indicator corresponding indicative of the unique identifier used as a callee ID when placing the incoming communication;
   transmitting a wireless notification signal from the first communication device to a second communication device associated with a second user in proximity of the first communication device; and
   generating a second indicator by the second communication device, the second indicator indicative of the unique identifier for the first video communication device.

17. The method of claim 16, wherein the generating the second indicator includes displaying a text-based message on the second communication device indicating that the first video communication device is receiving an incoming communication.

18. The method of claim 16, wherein transmitting the wireless notification signal from the first communication device to a second communication device is responsive to determining whether the first video communication device and the second communication device are in proximity based on a local network connection.

19. The method of claim 16, wherein transmitting the wireless notification signal from the first communication device is responsive to determining whether the first video communication device and the second communication device are within a predetermined threshold for a specified geographic range.

20. The method of claim 16, wherein the second indicator generated by the second communication device is identical as the first visual indicator displayed by the first video communication device.

* * * * *